(12) United States Patent
Henley

(10) Patent No.: US 7,480,421 B2
(45) Date of Patent: Jan. 20, 2009

(54) RENDERING OF HIGH DYNAMIC RANGE IMAGES

(75) Inventor: Sharon A. Henley, Mountain View, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 568 days.

(21) Appl. No.: 11/134,425

(22) Filed: May 23, 2005

(65) Prior Publication Data

US 2006/0262363 A1 Nov. 23, 2006

(51) Int. Cl.
*G06K 9/40* (2006.01)
*G06K 9/00* (2006.01)

(52) U.S. Cl. ..................................... 382/274

(58) Field of Classification Search ............. 348/223.1, 348/655, 690, E9.051, FOR. 200; 358/516; 382/274–275, 254, 162, 167
See application file for complete search history.

(56) References Cited

U.S. PATENT DOCUMENTS

| | | | | |
|---|---|---|---|---|
| 5,548,333 A | * | 8/1996 | Shibazaki et al. | 345/270 |
| 5,852,673 A | * | 12/1998 | Young | 382/164 |
| 5,982,926 A | * | 11/1999 | Kuo et al. | 382/167 |
| 6,111,980 A | | 8/2000 | Sano et al. | 382/167 |

(Continued)

FOREIGN PATENT DOCUMENTS

JP 10293841 A * 11/1998

OTHER PUBLICATIONS

IBM Technical Disclosure Bulletin (NN8811471) entitled "Fast Algorithm for Thresholding Images Whose Histograms Are Bimodal".*

(Continued)

*Primary Examiner*—Sherali Ishrat
(74) *Attorney, Agent, or Firm*—Fitzpatrick, Cella, Harper & Scinto

(57) ABSTRACT

White balance normalization of a high dynamic range image is performed by identifying a first image adaptation point for a relatively lighter portion of the image and a second image adaptation point for a relatively darker portion of the image. A first white point adjustment for the lighter portion of the image is performed using the first image adaptation point and a second white point adjustment for the darker portion of the image is performed using the second image adaptation point. Thus, multiple illumination sources can be taken into account in rendering a high dynamic range image, providing a more visually appealing rendered image.

19 Claims, 7 Drawing Sheets

U.S. PATENT DOCUMENTS

| | | | |
|---|---|---|---|
| 6,801,296 B2* | 10/2004 | Ikeda et al. | 355/38 |
| 6,809,761 B1 | 10/2004 | Tamaru et al. | 348/229.1 |
| 6,825,884 B1 | 11/2004 | Horiuchi | 348/362 |
| 2002/0147980 A1* | 10/2002 | Satoda | 725/90 |
| 2003/0103677 A1 | 6/2003 | Tastl et al. | 382/240 |
| 2003/0184827 A1* | 10/2003 | Fluery et al. | 358/520 |
| 2004/0051790 A1 | 3/2004 | Tamaru et al. | 348/223.1 |
| 2004/0136603 A1 | 7/2004 | Vitsnudel et al. | 282/254 |
| 2004/0190770 A1 | 9/2004 | Spaulding et al. | 382/167 |
| 2004/0207734 A1 | 10/2004 | Horiuchi et al. | 348/229.1 |
| 2005/0220340 A1* | 10/2005 | Nakabayashi et al. | 382/167 |
| 2005/0271280 A1* | 12/2005 | Farmer et al. | 382/224 |
| 2006/0204123 A1* | 9/2006 | Kempf et al. | 382/263 |

OTHER PUBLICATIONS

Paul E. Debevec and Jitendra Malik, "Recovering High Dynamic Range Radiance Maps from Photographs," Proc. SIGGRAPH '97, pp. 369-378 (1997), available at http://athens.ict.usc.edu/Research/HDR/debevec-siggraph97.pdf.

Kate Devlin, "A review of tone reproduction techniques," Technical Report, Department of Computer Science, University of Bristol, pp. 1-13 (Nov. 2002).

Garrett M. Johnson, "Cares and Concerns of CIE TC8-08: Spatial Appearance Modeling and HDR Rendering," submission to Electronic Imaging, pp. 1-9 (2005), http://www.colour.org/tc8-08/pub/pdfs/CIE808_EI.pdf.

* cited by examiner

RENDERING OF HIGH DYNAMIC RANGE IMAGES

BACKGROUND

1. Field of the Invention

This invention pertains to rendering of high dynamic range images, and specifically to white balance normalization using multiple adaptation points.

2. Related Background Art

As digital imaging becomes increasingly popular, consumers are demanding higher quality images from digital imaging equipment. One area of digital imaging in need of improvement is the rendering of high dynamic range (HDR) images. HDR image formats support up to 32 bits per channel, usually in "Float" format with an exponent. For example, an HDR image in RGB format requires up to 96 bits per pixel. TIFF Float is another example of an HDR format. HDR formats allow encoding of the full tonal range perceptible by human vision.

Successfully rendering an HDR image has proven difficult. Traditional techniques of tone mapping used to compress the HDR image are computationally expensive and can result in artifacts, such as ringing around bright light sources. Traditional methods can also produce unappealing luminance compression and color shifts in certain areas of the rendered image.

SUMMARY

To address the foregoing, the present invention provides a method and apparatus of white balance normalization of a high dynamic range image that recognizes HDR images often have more than one illumination source. The invention allows multiple illumination sources of the image to be taken into account when rendering the image.

HDR scenes are often the result of multiple illumination sources. One familiar example is a room with a window, in which the room is dimly illuminated by tungsten lighting, for example, and the outdoor scene is brightly illuminated by daylight. Such a scene possesses a high dynamic range due to the large difference in luminance of the interior lit by tungsten lighting and the exterior lit by daylight. Rendering an HDR image of such a scene with traditional techniques often produces unpleasant luminance compression and color shifts because traditional image processing techniques use only one reference white point, usually the brightest point of the image, for the adaptation.

In contrast, the present invention renders HDR images using multiple adaptation points. In accordance with the present invention, a white balance normalization of a high dynamic range image includes identifying a first image adaptation point for a relatively lighter portion of the image and a second image adaptation point for a relatively darker portion of the image. A first white point adjustment is performed for the relatively lighter portion of the image using the first image adaptation point, and a second white point adjustment is performed for the relatively darker portion of the image using the second image adaptation point. Preferably, the white point adjustments are performed in situ in memory, so as to conserve memory, also that upon completion of the above-described process the image is ready for rendering. The image is then rendered on, for example, a display or printer.

Thus, when an HDR scene such as the room with a window described above is tone mapped by a traditional technique, the resulting image typically suffers from uneven white balance because traditional techniques do not account for the different illumination sources. In contrast, the present invention renders an HDR image based on adaptation points for a relatively lighter portion of the image and for a relatively darker portion of the image. Thus, the invention allows multiple illumination sources to be taken into account in rendering an HDR image.

To determine the relatively lighter portion and the relatively darker portion, a threshold value measured in luminance can be used. The relatively lighter portion includes a portion of the image having a luminance value greater than the threshold value, and the relatively darker portion includes a portion of the image having a luminance value less than or equal to the threshold value. The threshold value can be determined by calculating a cumulative histogram of luminance of the image and equating the threshold value to a luminance value at a point of minimal slope of the cumulative histogram. The threshold value can also be determined by identifying the ISODATA threshold of the image and equating the threshold value to the ISODATA threshold.

Image adaptation points for the relatively lighter portion and the relatively darker portion can be calculated using, for example, the grey world assumption, the point of highest luminance, and other methods.

White point adjustment of each of the portions using the image adaptation points can be made based on a grey world assumption and/or based on a perfect reflecting diffuser (PDR) assumption. Preferably, however, the white point adjustments are made based on respective ratios of a grey world assumption to a PDR assumption. More specifically, the first white point adjustment is based on a first ratio of a first grey world assumption to a first PDR assumption, and the second white point adjustment is based on a second ratio of a second grey world assumption to a second PDR assumption. The first grey world assumption and the first PDR assumption are determined for the relatively lighter portion and based on the first image adaptation point. The second grey world assumption and the second PDR assumption are determined for the relatively darker portion and based on the second image adaptation point.

Visually pleasing results are often obtained by preprocessing of the image prior to derivation of the adaptation points and prior to white point adjustment. In one aspect, a logarithm of the image is calculated and the logarithm of the image is normalized so that an image minimum value equals zero, an image maximum value equals one, and an image mean value equals 0.5. The normalized logarithm is converted to an image in HSV format, and at least one saturation boost and a sharpness enhancement is performed on the image in HSV format to obtain a new HSV image. A user can select the level of at least one of the saturation boosts.

A cumulative histogram of luminance of the new HSV image is calculated, and a threshold value is determined by equating the threshold value to a luminance value at a point of minimal slope of the histogram. The new HSV image is converted to an image in RGB format. The relatively lighter portion of the RGB image is identified, wherein the relatively lighter portion includes pixels having a luminance value greater than the threshold value. The relatively darker portion of the RGB image is identified, wherein the relatively darker portion includes pixels having a luminance value less than or equal to the threshold value. A first white point adjustment for the relatively lighter portion and a second white point adjustment for the relatively darker portion are performed. The image is rendered after applying an image-dependent gamma correction, a saturation adjustment, and a sharpening filter.

The invention may be embodied in a method, apparatus or computer-executable program code.

This brief summary has been provided so that the nature of the invention may be understood quickly. A more complete understanding of the invention can be obtained by reference to the following detailed description in connection with the attached drawings.

DETAILED DESCRIPTION

Embodiments of the present invention are described below with reference to accompanying drawings. These embodiments describe a method of white balance normalization that recognizes that HDR images are often the result of multiple illuminant sources. Each of the multiple illuminant sources provides a visual reference for chromatic and luminance adaptation in the HDR image. In the methods described below, accounting for multiple illuminant sources facilitates more accurate rendering HDR images, particularly with regard to producing appealing global luminance compression and minimizing color shifts.

The methods described below recognize that a state of multiple adaptations can exist within a single image due to multiple illuminants observable in the scene. For example, a common high dynamic indoor-outdoor scene will have reference to an indoor illuminant, such as a tungsten bulb, as well as an outdoor illuminant, such as daylight. In traditional rendering methods, the use of a single white point reference can cause one or more areas of the scene to be rendered incorrectly. However, as the methods below recognize, if multiple white point references are utilized then each component of the image can be rendered based on its own adaptation reference point; thus, for example, unwanted color shifts can be reduced. Additionally, each of the luminance ranges can be scaled with regard to the particular area of the image, resulting in a combination of luminance and chromatic adaptation.

Subsequent to the luminance and chromatic adaptation, the image is rendered. Rendering can include an image-dependent gamma correction along with a saturation adjustment, which are often beneficial. In addition, a small sharpening filter can be used to eliminate some of the blurring that can result if extensive luminance compression has occurred.

Figure 1:
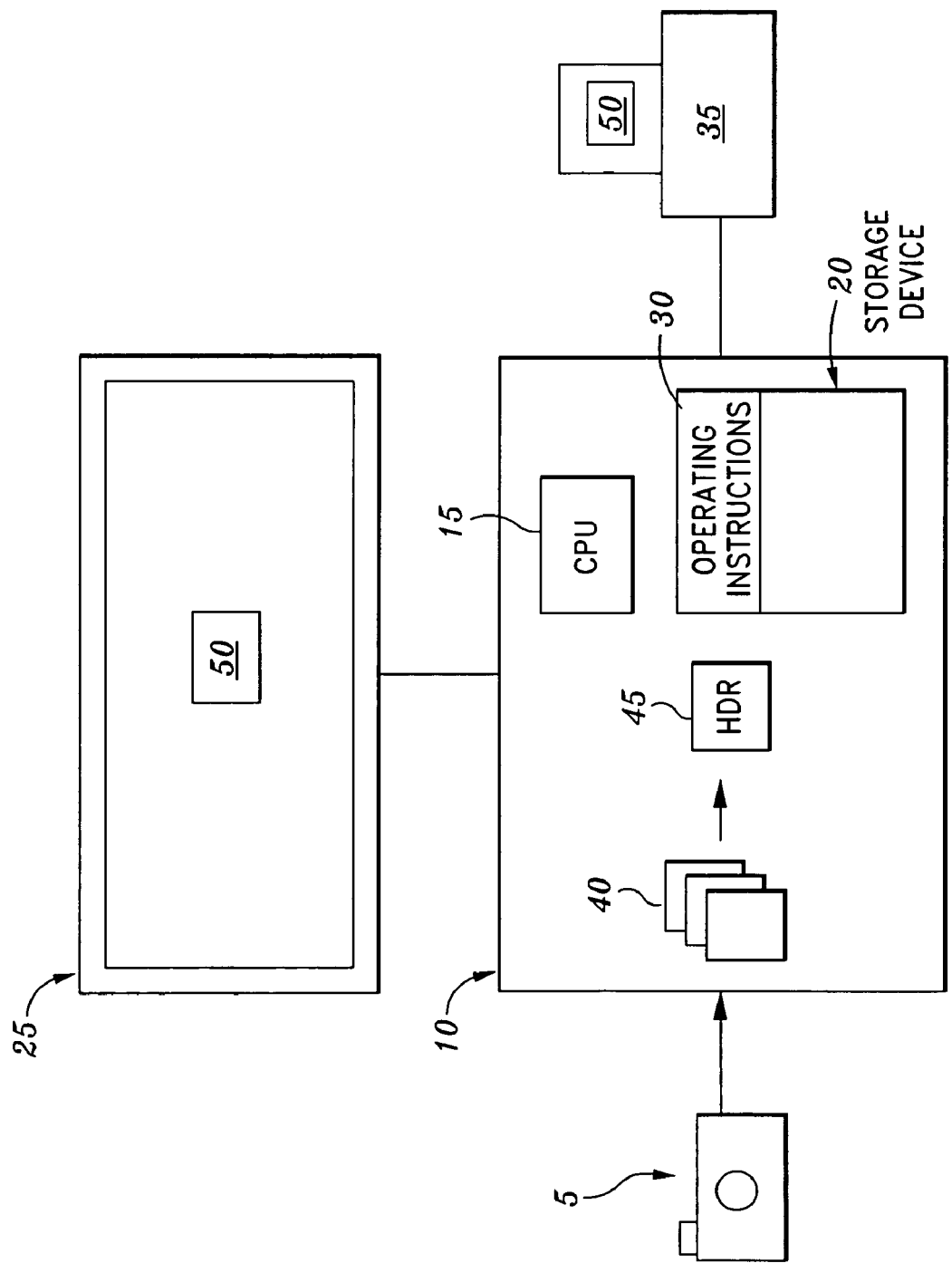
FIG. 1 is a block diagram of an exemplary environment in which an embodiment of the present invention can be implemented.

FIG. 1 depicts one representative embodiment of the present invention. A digital camera 5 is connected to a personal computer 10 having a CPU 15, a storage device 20, and a display 25. Storage device 20 is a computer-readable memory medium (which may be local or non-local such as a networked disk drive medium) that stores computer-executable operating instructions 30 according to an embodiment of the present invention described below. Personal computer 10 is also connected to a printer 35.

Digital camera 5 stores digital images 40, which are multiple exposures that bracket the dynamic range of an HDR scene. Digital images 40 are transferred to personal computer 10 and combined into an HDR image 45 for processing according to operating instructions 30. CPU 15 renders HDR image 45 according to operating instructions 30. The resulting rendered image 50 can be displayed on display 25 and printed on printer 35.

Figure 2:
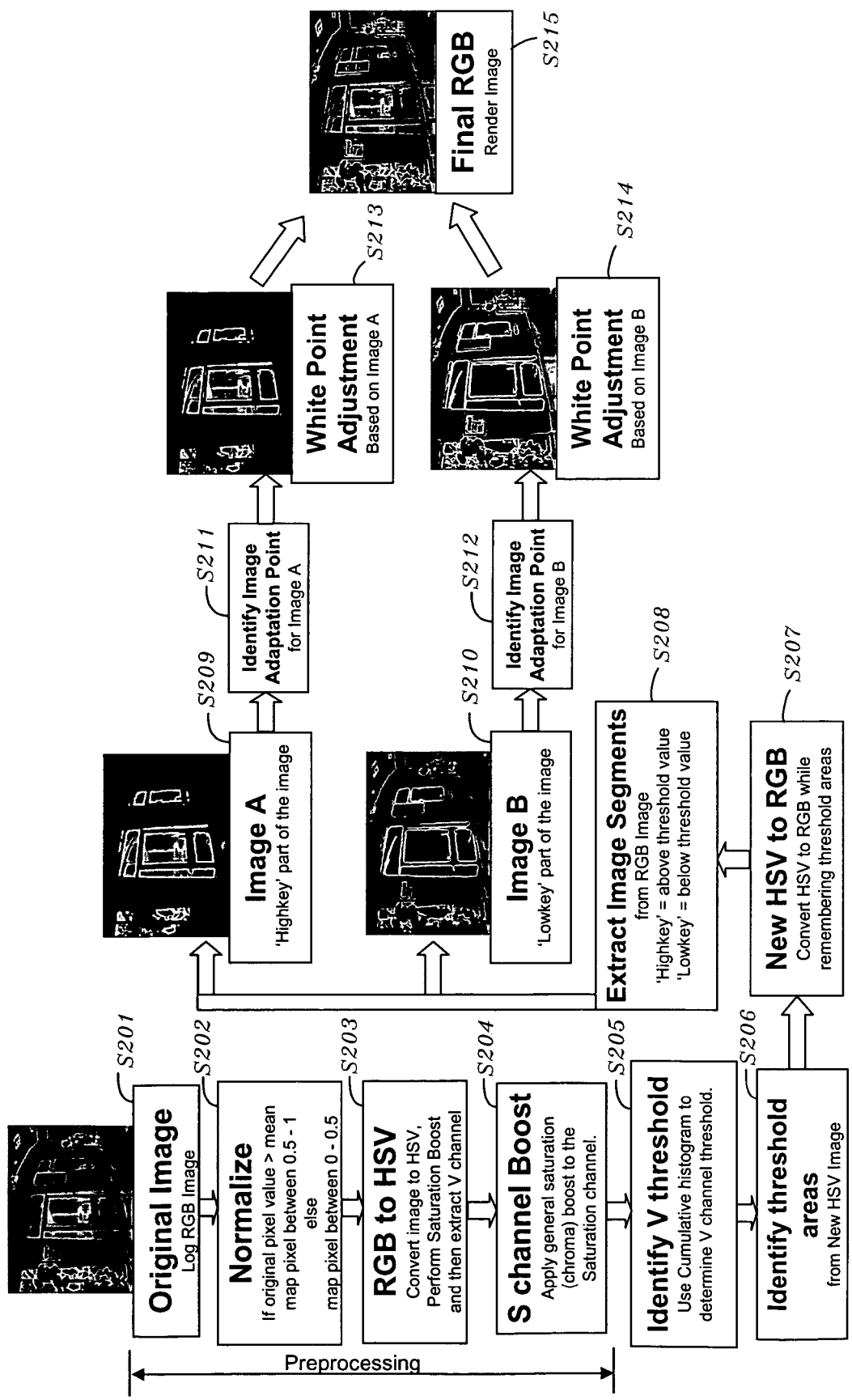
FIG. 2 is a process flowchart of a method for rendering an HDR image according to one embodiment of the present invention.

FIG. 2 depicts a process flowchart of a method for performing white balance normalization and rendering of an HDR image, such as HDR image 45 above, according to one embodiment of the present invention. Steps S201 through S204 preprocess the HDR image data so that an enhanced effect is realized. These steps are not strictly necessary, but they are preferred since they often result in a more pleasing visual rendering.

In step S201, an original HDR image in RGB radiance format is input, and the logarithm of the original image is calculated to create a log image. The log image is normalized (S202) by mapping the pixels of the log image to a scale of 0 to 1, creating a normalized image.

Figure 3:
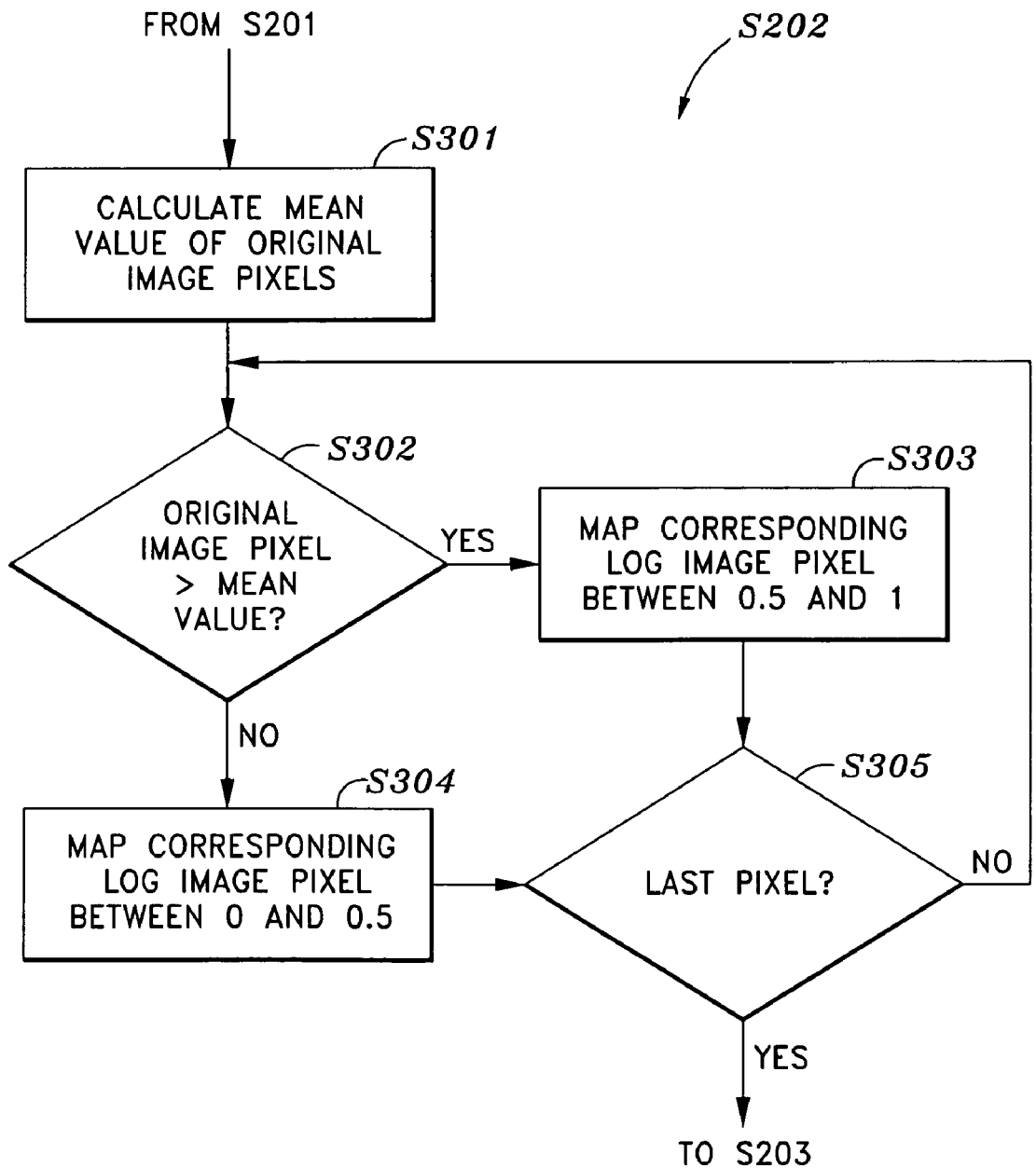
FIG. 3 is a process flowchart of a method for normalizing a log image according to one embodiment of the present invention.

FIG. 3 depicts an example of the normalization process of S202. Referring to FIG. 3, the mean value of the pixels of the original image is calculated (S301). Each original image pixel value is compared (S302) to the mean value. If the original image pixel value is greater than the mean of the pixel values, the corresponding log image pixel is mapped (S303) between 0.5 and 1. On the other hand, if the original image pixel value is less than or equal to the mean of pixel values, the corresponding log image pixel value is mapped (S304) between 0 and 0.5. This process continues (S305) until all of the pixels of the original image are compared with the mean value; thus, creating a normalized image.

Reverting to FIG. 2, at S203 the normalized image is converted to HSV format to create an HSV image, a saturation boost is performed on the HSV image, and the V channel is extracted. A general saturation boost is applied (S204) to the S channel to produce a new HSV image. The saturation boosts can be accomplished via a user interface to select a desired level of saturation. The above-described processing (S201 to S204) details preprocessing of the original HDR image, which can lead to a more visually appealing final image.

If the preprocessing steps S201 through S204 are not performed, then it is sufficient to transform the input HDR image, which is in RGB radiance format, to HSV space.

Figure 4:
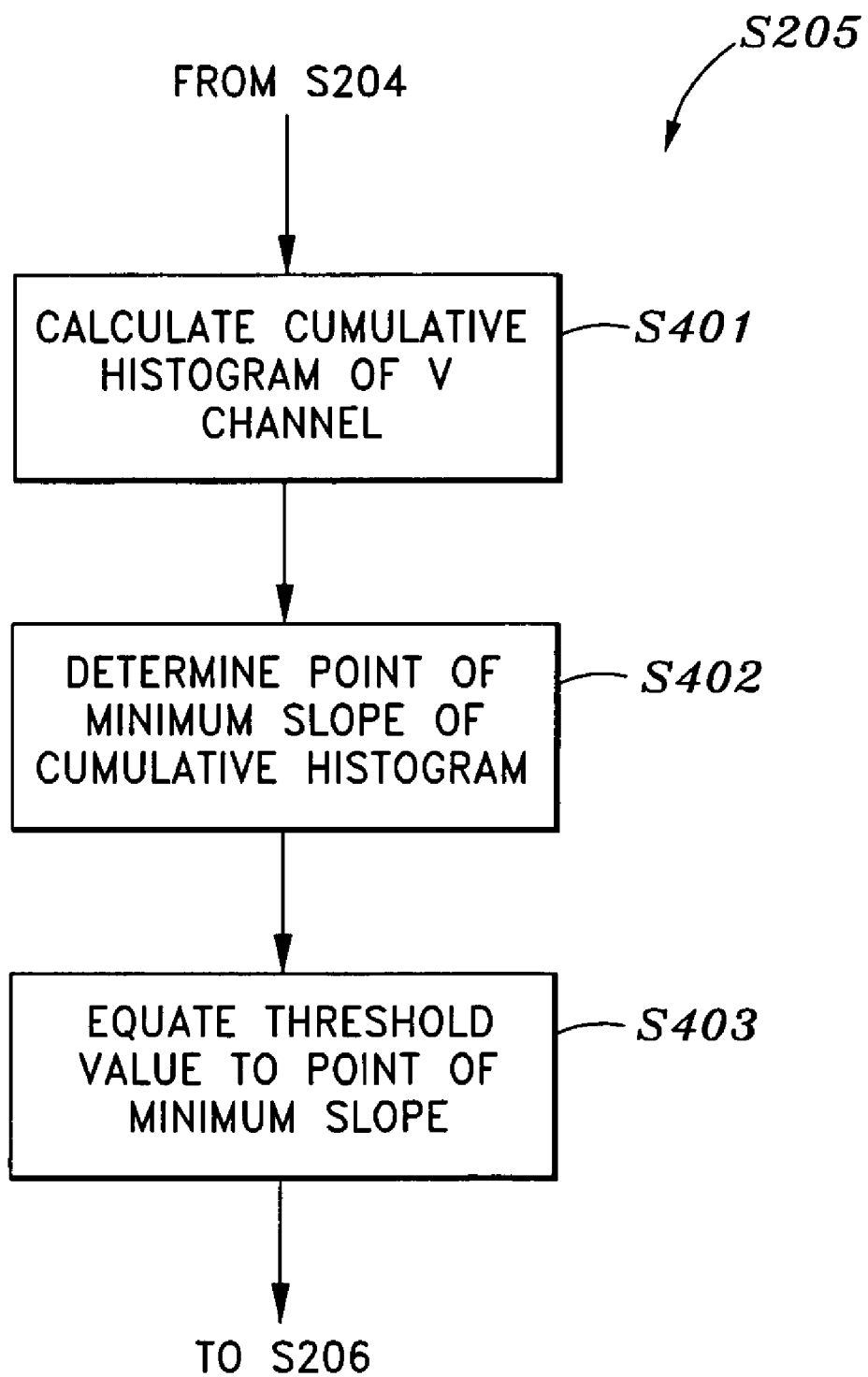
FIG. 4 is a process flowchart of a method for identifying a threshold value according to one embodiment of the present invention.

After preprocessing, a threshold value is determined (S205) using a cumulative histogram of the V channel. FIG. 4 is a more detailed depiction of S205. Referring to FIG. 4, a cumulative histogram of the V channel is calculated (S401). A point of minimal slope on the cumulative histogram is determined (S402). The threshold value is equated (S403) to the point of minimal slope.

Figure 5:
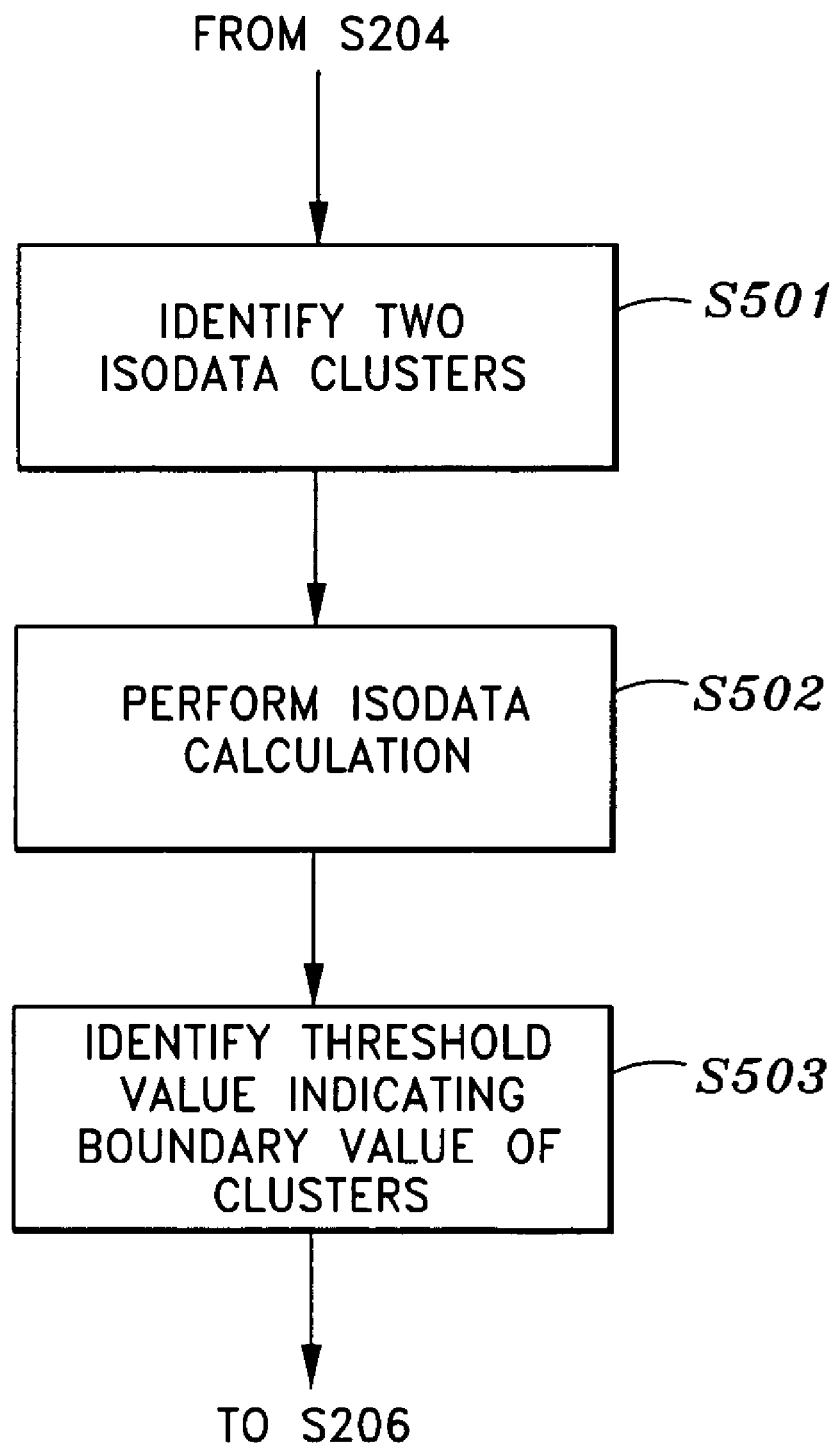
FIG. 5 is a process flowchart of another method for identifying a threshold value according to one embodiment of the present invention.

FIG. 5 depicts another method for determining the threshold value of S205. Referring to FIG. 5, the threshold value can be calculated by performing an ISODATA calculation. Accordingly, the process of FIG. 5 can replace the process of FIG. 4 to calculate the threshold value. As shown in FIG. 5, a required number of cluster is identified (S501), in this case one for each illumination. An ISODATA calculation is performed (S502), which iteratively segregates the value of each pixel in the image into a given cluster based upon the mean and standard deviation of the entire range of pixels in the image. Once the iteration has converged to assign all pixel values into one of two clusters, a threshold value is identified (S503) indicating the boundary value of the clusters. The method of using a cumulative histogram and the method of using an ISODATA calculation are merely examples of methods of calculating the threshold value. One skilled in the art will recognize that there are other methods suitable for calculating the threshold value.

Figure 6:
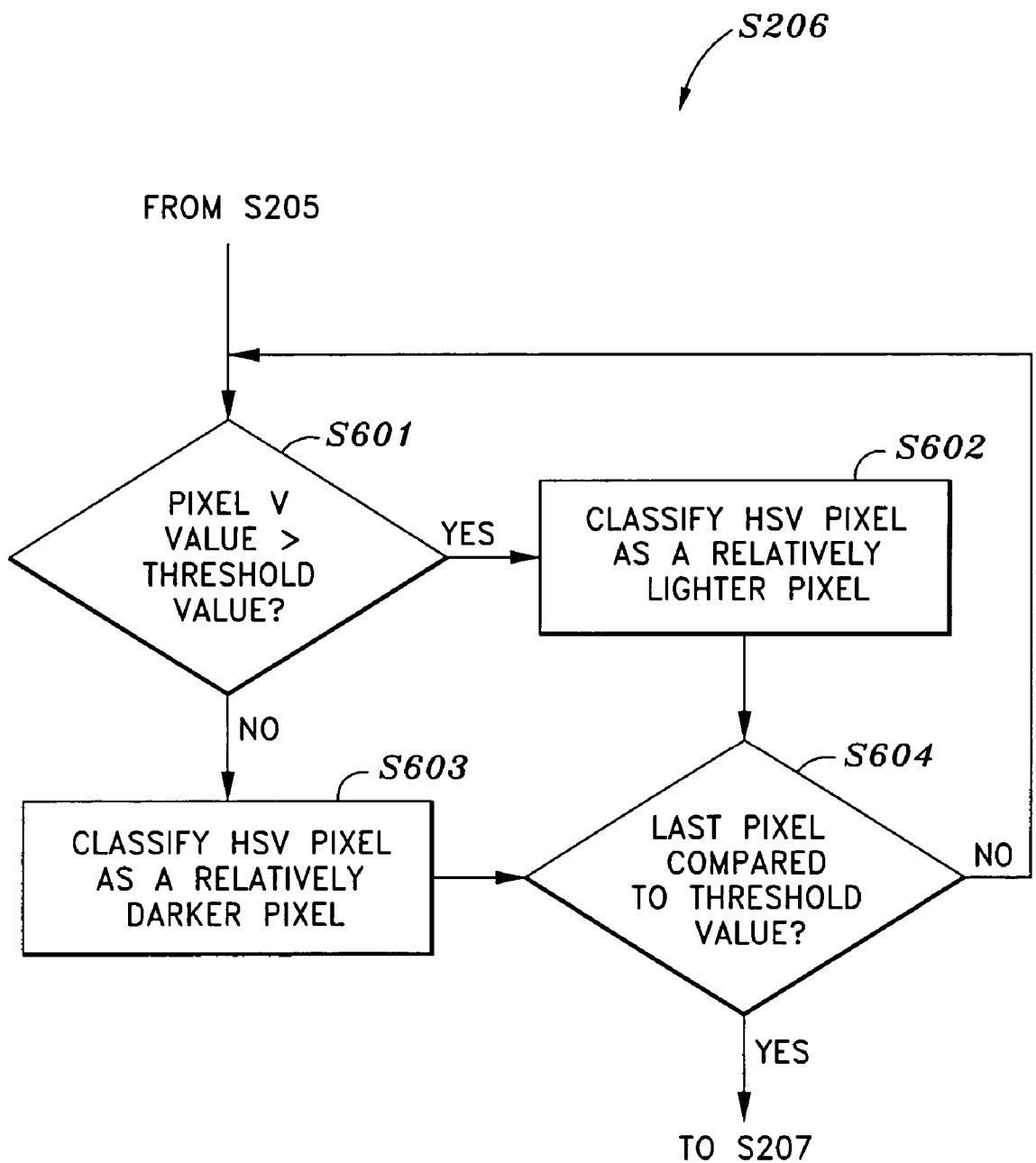
FIG. 6 is a process flowchart of a method for identifying threshold areas according to one embodiment of the present invention.

Reverting to FIG. 2, at block S206 a relatively lighter and a relatively darker portion of the HSV image are determined by applying the threshold value. FIG. 6 is a more detailed depiction of S206.

Referring to FIG. 6, the V value of a pixel of the HSV image is compared (S601) to the threshold value. If the V value is greater than the threshold value, the HSV pixel is classified (S602) as a relatively lighter pixel. If the V value of the pixel is less than or equal to the threshold value, the HSV pixel is classified (S603) as a relatively darker pixel. This process is repeated (S604) for all of the pixels in the HSV image. Thus, the relatively lighter portion of the HSV image includes the relatively lighter pixels, and the relatively darker portion of the HSV image includes the relatively darker pixels.

Reverting to FIG. 2, the new HSV image is converted (S207) into RGB format to create an RGB image, while remembering the relatively lighter portion and the relatively darker portion (threshold areas) of the new HSV image. Image segments of the RGB image are extracted (S208) corresponding to the threshold areas of new HSV. Thus, the relatively lighter portion (or 'highkey' part) of the RGB image corresponds to the relatively lighter portion of the HSV image, and the relatively darker portion (or 'lowkey' part) of the RGB image corresponds to the relatively darker portion of the HSV image. The image segments are identified and processed in situ in memory so as to conserve memory and to allow (at step S215) that the image is ready for rendering; however, for purposes of illustration FIG. 2 depicts separated image segments as Image A (S209) and Image B (S210) corresponding to the highkey and lowkey parts, respectively, that are "extracted" from the RGB image. Although the image segments can be separated for subsequent white balance processing, in situ processing reduces computational complexity and memory requirements.

An image adaptation point for the Image A is identified (S211). Similarly, an image adaptation point for the Image B is also identified (S212). One method to identify an image adaptation point utilizes the highest luminance point. Using Image A as an example, the highest luminance point is based on the fact that in Image A there is a point or points of maximal reflectance for each of the RGB components. This point or points is used for the image adaptation point for Image A.

The image adaptation points can also be determined using the grey world assumption. The grey world assumption states that, given an image with a sufficient amount of color variations, the average value of the red, green and blue components of the image should average out to a common grey value. This assumption is generally valid since in any given real world scene, it is often the case that many different color variations exist. Since the variations in color are random and independent, it would be safe to say that given a sufficient number of samples, the average should tend to converge to the mean value, which is grey. Again using Image A as an example, in the grey world assumption the average of all colors in the Image A is equated to grey; thus, the RGB components of the average image are equal. The image adaptation point is determined by the amount Image A departs from the calculated grey.

Once the image adaptation points are identified for Image A and Image B, white point adjustments are performed on Image A and Image B using the respective image adaptation points. A white point adjustment is performed (S213) on the Image A, the highkey part of the RGB image. A white point adjustment is also performed (S214) on Image B, the lowkey part of the RGB image. In one method of performing the white point adjustments, the grey world assumption for the image segment is calculated, and the perfect reflecting diffuser assumption is calculated for the image segment. The grey world assumption and the perfect reflecting diffuser assumption are based on the image adaptation point for the image segment. The white point adjustment is based on a ratio of the grey world assumption and the perfect reflecting diffuser assumption. The white point adjustments can also be performed using only the grey world assumption or only the perfect reflecting diffuser assumption.

Figure 7:
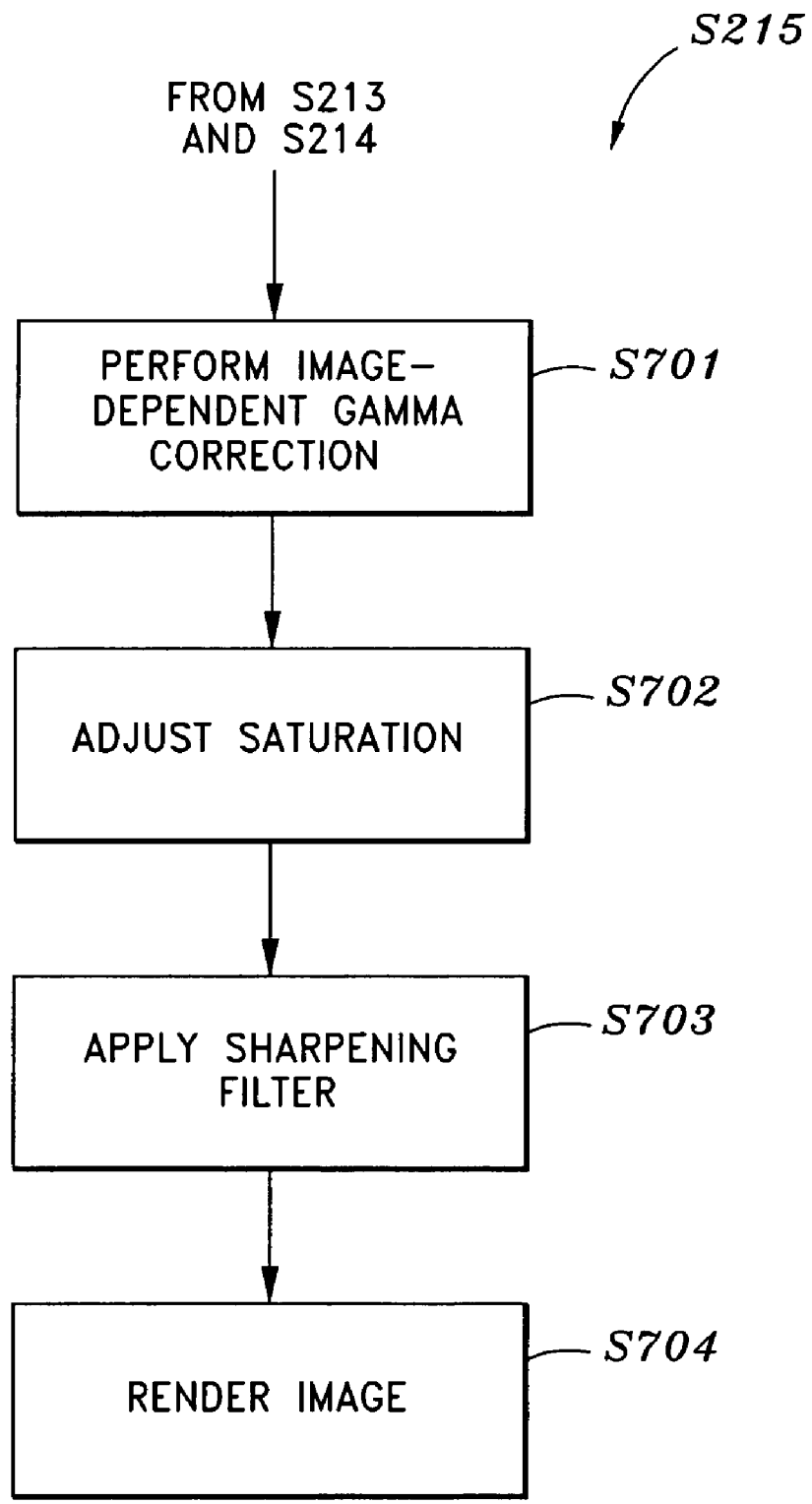
FIG. 7 is a process flowchart of a method for rendering a processed image according to one embodiment of the present invention.

Finally, the processed image is rendered (S215), for example, on a display or printer. FIG. 7 is a more detailed depiction of S215. Referring to FIG. 7, an image-dependent gamma correction is performed (S701) on the processed image. The saturation of the processed image is adjusted (S702). A small sharpening filter is applied (S703) to the processed image. Finally, the processed image is rendered (S704).

Although this invention has been described with the aid of certain specific embodiments, many additional modifications and variations would be apparent to those skilled in the art. It is therefore to be understood that this invention may be practiced otherwise than as specifically described. Thus, the above-described embodiments of the invention should be considered in all respects as illustrative and not restrictive, the scope of the invention to be determined by the claims and their equivalents.

What is claimed is:

1. A method for processing high dynamic range image data which includes pixels whose values have a high dynamic range, so as to obtain counterpart image data which is renderable, the method comprising:

using computer to perform the following steps:
classifying each pixel of the high dynamic range image data into one of at least two different portions which include a relatively lighter portion and a relatively darker portion;

identifying an image adaptation point for each of said different portions, said identifying step including the steps of identifying a first image adaptation point for the lighter portion and identifying a second image adaptation point for the darker portion; and performing white point adjustment for the value of each pixel in each of said different portions by using the corresponding image adaptation point for each said portion, said step of performing white point adjustment including the steps of performing a first white point adjustment for the values of pixels of the lighter portion using the first image adaptation point and performing a second white point adjustment for the values of the pixels of the darker portion using the second image adaptation point.

2. The method of claim 1, further comprising determining the relatively lighter portion and the relatively darker portion using a threshold value.

3. The method of claim 2, wherein the threshold value is measured in luminance, wherein the relatively lighter portion includes an area of the image having a luminance value greater than the threshold value, and the relatively darker portion includes an area of the image having a luminance value less tart or equal to the threshold value.

4. The method of claim 3, further comprising determining the threshold value by:
    calculating a cumulative histogram of luminance of the image; and
    equating the threshold value to a luminance value at a point of minimal slope of the histogram.

5. The method of claim 3, further comprising determining the threshold value by:
    determining an ISODATA threshold of the image; and
    equating the threshold value to the ISODATA threshold.

6. The method of claim 1, wherein the first white point adjustment is based on a first grey world assumption for the relatively lighter portion using the first image adaptation point, and the second white point adjustment is based on a second grey world assumption for the relatively darker portion using the second image adaptation point.

7. The method of claim 1, wherein the first white point adjustment is based on a first perfect reflecting diffuser assumption for the relatively lighter portion using the first image adaptation point, and the second white point adjustment is based on a second perfect reflecting diffuser assumption for the relatively darker portion using the second image adaptation point.

8. The method of claim 1, wherein:
    the first white point adjustment is based on a first ratio of a first grey world assumption to a first perfect reflecting diffuser assumption;
    the second white point adjustment is based on a second ratio of a second grey world assumption to a second perfect reflecting diffuser assumption; and
    the first grey world assumption and the first perfect reflecting diffuser assumption are determined for the relatively lighter portion and based on the first image adaptation point, and the second grey world assumption and the second perfect reflecting diffuser assumption are determined for the relatively darker portion and based on the second image adaptation point.

9. The method of claim 1, further comprising:
    normalizing the image so that an image minimum value equals zero, an image maximum value equals one, and an image mean value equals 0.5.

10. The method of claim 9, further comprising:
    converting the normalized image to an HSV image in HSV format;
    performing at least one saturation boost and a sharpness enhancement on the HSV image to obtain a new HSV image; and
    converting the new HSV image to an RGB image in RGB format.

11. The method of claim 10, further comprising:
    calculating a cumulative histogram of luminance of the new HSV image; and
    equating a threshold value to a luminance value at a point of minimal slope of the histogram.

12. The method of claim 11, wherein the relatively lighter portion includes a portion of the RGB image having a luminance value greater than the threshold value, and the relatively darker portion includes a portion of the RGB image having a luminance value less than or equal to the threshold value.

13. The method of claim 12, wherein a user selects the level of saturation boost.

14. The method of claim 1, wherein the first and second adaptation points are identified using an identifying process, and the identifying process is selected from the group consisting of the grey world assumption and the point of highest luminance.

15. The method of claim 1, further comprising rendering the image subsequent to the first white point adjustment and the second white point adjustment.

16. The method of claim 15, wherein rendering further includes applying an image-dependent gamma correction, a saturation adjustment, and a sharpening filter.

17. An apparatus for processing high dynamic range image data which includes pixels whose values have a high dynamic range, so as to obtain counterpart image data which is renderable, the apparatus comprising:
    classifying means for classifying each pixel of the high dynamic range image data into one of two different portions which include a relatively lighter portion and a relatively darker portion;
    an identification means for identifying an image adaptation point for each of said different portions, said identification means including means for identifying a first image adaptation point for the lighter portion and for identifying a second image adaptation point for the darker portion; and
    a white point adjustment means for performing white point adjustment for the value of each pixel in each of said different portions by using the corresponding image adaptation point for each said portion, said white point adjustment means including means for performing a first white point adjustment for the values of the pixels of the lighter portion using the first image adaptation point and for performing a second white point adjustment for the values of the pixels of the darker portion using the second image adaptation point.

18. A computer-readable medium that stores computer-executable process steps, said computer-executable process steps for performing white balance normalization of a high dynamic range image, the computer-executable instructions executable to perform a method according to any of claims 1 to 16.

19. An apparatus for processing high dynamic range image data which includes pixels whose values have a high dynamic range, so as to obtain counterpart image data which is renderable, the apparatus comprising:
    a classifying unit adapted to classify each pixel of the high dynamic range image data into one of at least two different portions which include a relatively lighter portion and a relatively darker portion;
    an identifying unit adapted to identify an image adaptation point for each of said different portions, said identifying step including the steps of identifying a first image adaptation point for the lighter portion and identifying a second image adaptation point for the darker portion; and
    a performing unit adapted to perform white point adjustment for the value of each pixel in each of said different portions by using the corresponding image adaptation point for each said portion, wherein said performing unit performs white point adjustment including the steps of performing a first white point adjustment for the values of the pixels of the lighter portion using the first image adaptation point and performs a second white point adjustment for the values of the pixels of the darker portion using the second image adaptation point.

* * * * *